Aug. 7, 1956 R. M. BOVARD ET AL 2,758,015
QUICK STARTING OXYGEN PRODUCING APPARATUS
Filed June 12, 1953 2 Sheets-Sheet 1

INVENTORS
ROBERT M. BOVARD AND
WILLIAM C. HAMILTON
BY
Brown, Critchlow, Flick & Peckham
THEIR ATTORNEYS Aug. 7, 1956     R. M. BOVARD ET AL     2,758,015
QUICK STARTING OXYGEN PRODUCING APPARATUS
Filed June 12, 1953     2 Sheets-Sheet 2

INVENTORS
ROBERT M. BOVARD AND
WILLIAM C. HAMILTON
BY
Brown, Critchlow, Flick & Peckham
THEIR ATTORNEYS

United States Patent Office 2,758,015
Patented Aug. 7, 1956

2,758,015

QUICK STARTING OXYGEN PRODUCING APPARATUS

Robert M. Bovard, Mars, and William C. Hamilton, Pittsburgh, Pa., assignors to Mine Safety Appliances Company, Pittsburgh, Pa., a corporation of Pennsylvania Application June 12, 1953, Serial No. 361,336

9 Claims. (Cl. 23—281)

This invention relates to self-contained breathing apparatus, and more particularly to the carbon dioxide absorbing and oxygen generating canister therein.

Such a canister has an inlet connected with the outlet of a respirator facepiece, while the outlet of the canister generally is connected with a breathing bag that communicates with the inlet of the facepiece. The canister contains a chemical that releases oxygen and absorbs carbon dioxide from the breath, and also one or more mechanically activated oxygen producing candles. Under abnormal and emergency conditions the candles supply oxygen until the canister chemical starts generating it. Of equal importance, the candles supply heat to initiate the chemical reaction. Then, the moisture and carbon dioxide in the user's breath react with the chemical to generate oxygen, but this generation is retarded materially if the chemical is at a low temperature, as in Arctic regions or very high altitudes. In such cases, where the candle burns at a uniform rate, the auxiliary supply of oxygen may be consumed before the canister chemical is generating oxygen at a sufficient rate to sustain life.

It is among the objects of this invention to provide an oxygen producing canister which is quick starting, in which the chemical reaction is accelerated by auxiliary heat, and in which an oxygen producing candle burns longer for its size than heretofore.

In accordance with this invention, the candle is placed in a space between the bottom of the chemical and the bottom of the canister. The heat rising from the burning candle therefore quickly raises the temperature of the chemical to accelerate its reaction with the exhaled breath of the user. Furthermore, the life of the burning candle is increased, without increasing its size, by forming it in such a way that the amount of oxygen produced is gradually reduced as the candle burns, so that the supply of oxygen is extended over a longer period of time.

The preferred embodiment of the invention is illustrated in the accompanying drawings, in which Fig. 1 is a top view of our canister;

Figure 1:
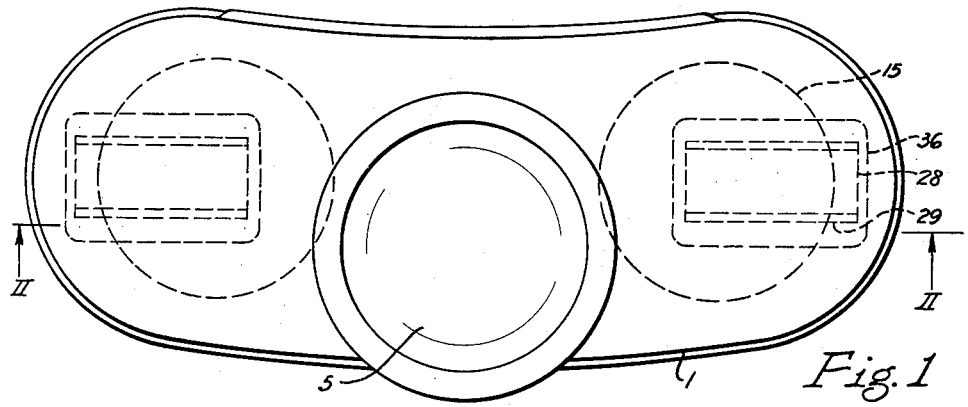
Figure 2:
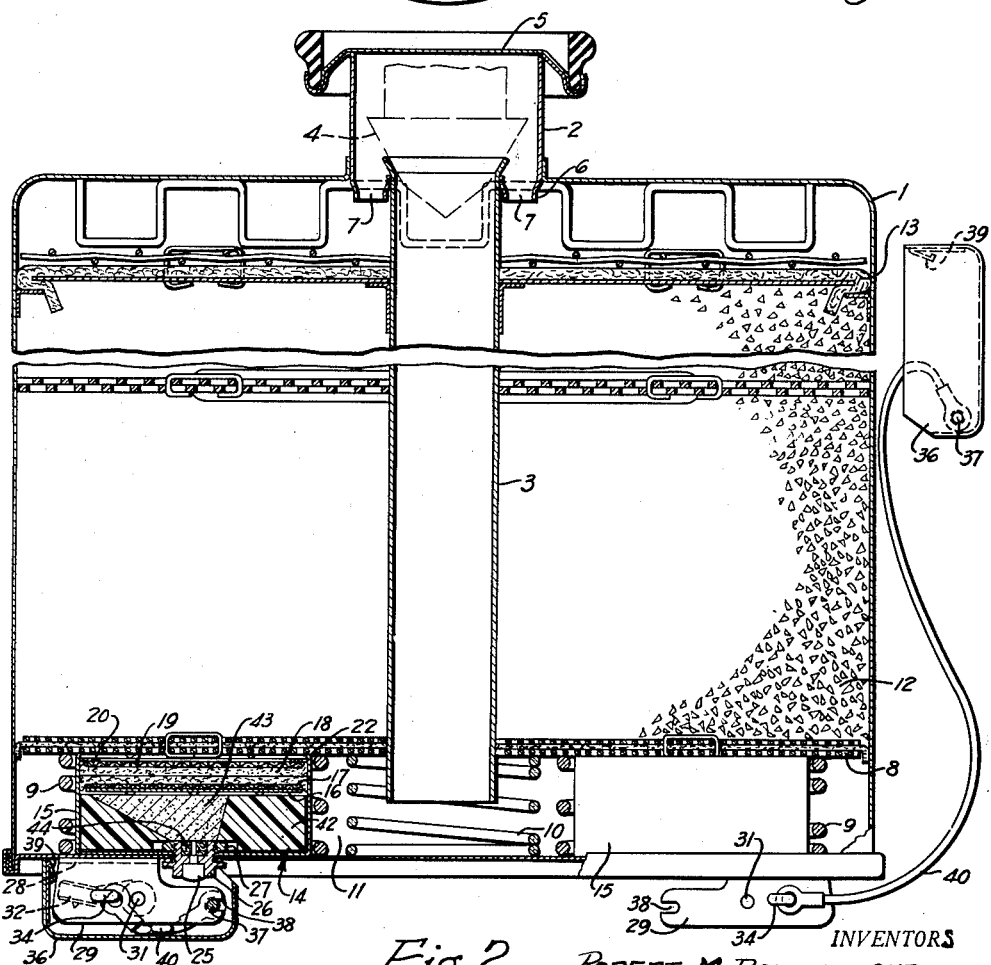
Fig. 2 is a vertical section, with the central portion of the canister broken away, taken on the line II—II of Fig. 1.

Referring to Figs. 1 and 2 of the drawings, a metal can 1 is provided in its top with an opening, from which a neck 2 extends upward. Concentric with the opening in the top of the can, but spaced inward therefrom, is a vertical inlet tube 3, the upper end of which is flared for receiving the pointed lower end of a slide valve 4 indicated in broken lines in Fig. 2 and communicating with the exhalation tube (not shown) of a respirator facepiece. Before the canister can be used, a thin metal disc 5 that seals the upper end of the neck has to be punctured in a well known manner by the pointed end of the slide valve. Tube 3 is supported by a spider 6 carried by the lower end of the neck. The openings 7 through the spider around the tube serve as outlets from the can, and they communicate with a breathing bag (not shown) connected to the facepiece.

The lower end of the vertical tube 3 is spaced a short distance from the bottom of the can to permit the exhaled air to escape from the tube, and it is surrounded by a perforated horizontal screen 8 that extends into engagement with the side walls of the can. The screen is held in position by some coil springs 9 and 10 in the space 11 between it and the bottom of the can. This screen supports a pervious body 12 formed of a granular chemical of the well-known type which reacts with moisture and carbon dioxide to remove the latter and generate oxygen. The top of the chemical is covered by a pervious member 13 that is spaced from the top of the can. When the wearer of the apparatus exhales, his breath passes down through central tube 7 and out of its lower end and then up into the chemical. The chemical reaction that eventually takes place removes the carbon dioxide and causes oxygen to be generated which leaves the canister through outlets 7 around the upper end of the tube.

Because it takes some time for the chemical to get into full scale operation, especially when it is quite cold, provision is made for producing oxygen in the meantime. This is done by placing one or more oxygen producing candles in the canister. These candles are made of a well-known composition that gives off oxygen while it is burning. It is a feature of this invention that the chemical reaction which generates oxygen in the canister is greatly accelerated at low ambient temperatures by locating the candles 14 in space 11. With this arrangement, the heat produced by a burning candle rises through the chemical above it and quickly raises its temperature so that the desired chemical reaction will be hastened.

Each candle is housed in a cup 15 which rests on the bottom of the can inside a spring 9 and may engage screen 8 above it, as shown in Fig. 2. Inside the upper part of the cup there is means for filtering out smoke that may be produced by the burning candle. This may consist of a dimpled metal baffle plate 16 resting on top of the candle, a screen on top of the plate 17, a layer or two of filtering material 18, another screen 19 and a ring 20 pressed down onto the latter by indentations 22 in the top of the cup around it. The baffle plate insulates the filtering material from the red hot candle surface.

Figure 3:
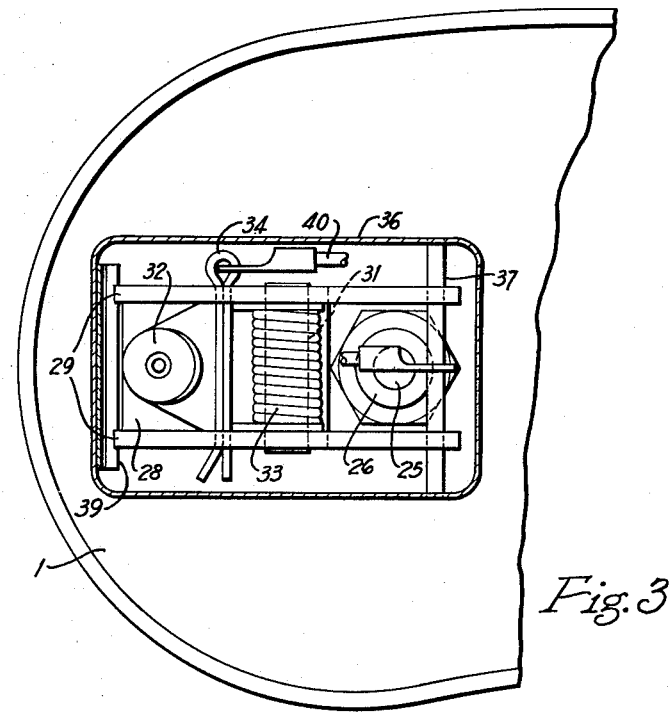
Fig. 3 is an enlarged bottom view of one of the firing devices.

Each candle is ignited by a primer 25, which is held in the lower end of a flanged sleeve 26 that extends up through openings in the bottoms of the cup and canister and into a recess in the bottom of the candle. Screwed on the upper end of the sleeve and tightly against the bottom of the cup is a nut 27. The top wall 28 of a bracket is brazed to the bottom of the canister beside the sleeve. The bracket has spaced parallel side walls 29 provided with aligned openings in which a pivot pin 31 is mounted. A firing member or hammer 32 is pivotally mounted on the pin between the bracket walls for detonating the primer. A torsion spring 33 (Fig. 3) urges the hammer toward the primer, but a cotter pin 34 extending through the bracket walls normally holds the hammer retracted against the resistance of the spring. The firing mechanism is concealed and protected by a cap 36 that covers the bracket. The end of the cap adjacent the primer has a cross pin 37 anchored in its side walls and extending through notches 38 in the ends of the bracket side walls. The cross pin is held in the notches, to hold the cap in place, by means of a leaf spring 39 that is brazed to the inside of the end of the cap farthest from sleeve 26. This spring presses against the adjacent ends of bracket side walls 29 and thereby holds cross pin 37 in notches 38.

The cap can be removed by pulling it downward and in toward the center of the canister. The cross pin of the cap is connected to the cotter pin by a cord 40 so that the pin can be yanked endwise out of the bracket to permit the firing pin to explode the primer. As soon as the candle is ignited it starts to give off oxygen, and due to its location below the chemical it quickly heats the chemical so that the latter reacts more quickly with the carbon dioxide and moisture exhaled into the canister. Therefore, the chemical very soon starts to generate oxygen, even in extremely cold regions, and this is done at an increasing rate until the chemical is generating at full capacity.

Figure 4:
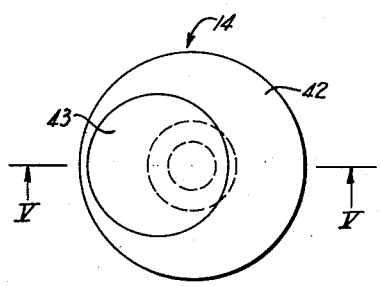
Fig. 4 is a plan view of a candle alone.
Figure 5:
Fig. 5 is a vertical section of the candle taken on the line V—V of Fig. 4.

In the past, oxygen candles have produced oxygen at practically the same rate from the time they were ignited until completely consumed. This resulted not only in fairly rapid consumption of the candles, but also in waste of oxygen and discomfort to the user due to excess operating pressures, because a candle only needs to supplement the oxygen generated by the chemical. Therefore, as the generation of oxygen by the chemical increases, less supplemental oxygen is required from the candle. To obtain greater efficiency, we use a candle so formed that the width of the burning area continually decreases after an initial period, so that less and less oxygen will be produced. This conserves the oxygen by not producing it faster than it is needed, and spreads its production out over a longer period of time. Accordingly, the cylindrical body 42 of the candle is provided with an opening that extends down through it. As shown in Figs. 2, 4 and 5, this opening contains a starting core 43 of ignition material which, when ignited, will ignite the wall of the opening throughout the thickness of the body. To light the core, which will immediately burn throughout its thickness, the upper end of sleeve 26 is filled with flash powder 44 that is ignited by primer 25 when the latter is struck by the firing hammer. The sleeve preferably is coaxial with the candle body and cup, but the core-receiving opening in the candle is located off-center relative to the body so that the thin wall side of the opening will burn through quickly and the width of the area of the candle that continues to burn will decrease as the burning proceeds toward the side of the body farthest from the core.

Figure 6:
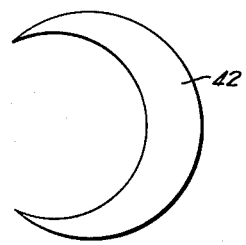
Fig. 6 is a plan view of a partially burned candle.

The core-receiving opening through the body preferably is tapered downwardly to increase for reasons of strength the lateral thickness of the body between the correspondingly tapered core and the nearest side of the body. Because the flash powder is at the center of the candle, the tapered core is lopsided, with the center of its lower end at the axis of the candle. A core of satisfactory shape can be formed in a simple manner by molding it in the form of an oblique frustrum of a right cone. The core will ignite the candle body all around it to produce oxygen at a maximum rate at first. Then, as shown in Fig. 6, when the thin wall of the body burns away and the burning proceeds toward the opposite side, the width of the area being consumed will gradually decrease so that oxygen will be produced at a diminishing rate. During the same period, however, the chemical is generating oxygen at a gradually increasing rate, so that the rate at which oxygen is supplied by the canister remains substantially constant. Because the candle burns at a diminishing rate, it burns longer than if it burned at the same high rate from start to finish, and therefore it assures a supply of oxygen over a longer period of time for instances where the chemical 12 may be slow in reacting. When two chandles are used, one can be saved for emergencies, such as when the chemical is exhausted while the user is still in vitiated air.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A quick starting oxygen producing canister, comprising a can provided with an inlet and an outlet, a pervious body of chemical in the can adapted to generate oxygen when subjected to carbon dioxide and moisture in a user's exhaled breath, means supporting the bottom of said body above the bottom of the can, an oxygen producing candle in the can, and manually operable means for igniting the candle to supply oxygen before said chemical can generate oxygen rapidly enough for the user, the candle being located between the bottoms of said chemical body and can, whereby the heat rising from the candle will hasten the reaction of carbon dioxide and moisture with the chemical.

2. A quick starting oxygen producing canister, comprising a can provided with an inlet and an outlet, a pervious body of chemical in the can adapted to generate oxygen when subjected to carbon dioxide and moisture in a user's exhaled breath, means supporting the bottom of said body above the bottom of the can, an oxygen producing candle in the can, and manually operable means for igniting the candle to supply oxygen before said chemical can generate oxygen rapidly enough for the user, the candle being located between the bottoms of said chemical body and can, whereby the heat rising from the candle will hasten the reaction of carbon dioxide and moisture with the chemical, and said candle being formed to produce oxygen at a diminishing rate as the generation of oxygen by said chemical increases.

3. An oxygen producing candle comprising a body of oxygen producing material having top and bottom faces and a circular side wall, said body being provided with an opening extending vertically through it, a starting core of ignition material filling said opening and adapted to ignite the wall of the opening throughout the thickness of said body, said opening and core being off-center relative to said body, whereby oxygen will be produced at a diminishing rate as burning proceeds toward the side of the body farthest from said core.

4. An oxygen generating candle comprising a body of oxygen producing material having top and bottom faces and a circular side wall, said body being provided with a downwardly tapered opening extending through it, and a tapered starting core of ignition material filling said opening and adapted to ignite the wall of the opening throughout the thickness of said body, said opening and core being off-center relative to said body, whereby oxygen will be produced at a diminishing rate as burning proceeds toward the side of the body farthest from said core.

5. An oxygen generating candle comprising a body of oxygen producing material having top and bottom faces and a circular side wall, said body being provided with a downwardly tapered opening extending through it, and a tapered starting core of ignition material filling said opening and adapted to ignite the wall of the opening throughout the thickness of said body, said opening and core having the center of their upper ends offset laterally from the axis of said body and having the center of their lower ends substantially coinciding with said axis, whereby oxygen will be produced at a diminishing rate as burning proceeds toward the side of the body farthest from said core.

6. An oxygen generating candle comprising a body of oxygen producing material having top and bottom faces and a circular side wall, said body being provided with a downwardly tapered opening extending through it, the upper end of the opening being elliptical with its center offset laterally from the axis of said body, the lower end of said opening being round with its center substantially coinciding with said axis, and a tapered starting core of ignition material filling said opening and adapted to ignite the wall of the opening throughout the thickness of said body, whereby oxygen will be produced at a diminishing rate as burning proceeds toward the side of the body farthest from said core.

7. An oxygen generating candle comprising a body of oxygen producing material having top and bottom faces and a circular side wall, said body being provided with a downwardly tapered opening extending through it, said opening being the shape of an oblique frustum of a right cone with the center of the lower end of the opening substantially coinciding with the axis of said body, and a tapered starting core of ignition material filling said opening and adapted to ignite the wall of the opening throughout the thickness of said body, whereby oxygen will be produced at a diminishing rate as burning proceeds toward the side of the body farthest from said core.

8. An oxygen producing candle comprising a body of oxygen producing material having top and bottom faces connected by a side wall, said body being provided with a vertically extending opening closer to one side of the body than another, and a starting core of ignition material filling said opening and adapted to ignite the wall of the opening throughout the thickness of said body, said opening and core being located in such position in said body that the width of the burning area of the body will decrease as burning proceeds toward the side of the body farthest from said core, whereby oxygen will be produced at a diminishing rate.

9. An oxygen producing candle comprising a body of oxygen producing material having top and bottom faces connected by a side wall, an ignition core mounted in said body for igniting it, the body being formed to provide a path of burning that becomes narrower as it recedes from the core, whereby oxygen will be produced at a diminishing rate.

References Cited in the file of this patent

UNITED STATES PATENTS

| | | |
|---|---|---|
| 2,389,225 | Wieczorek et al. | Nov. 20, 1945 |
| 2,517,209 | Jackson et al. | Aug. 1, 1950 |
| 2,558,756 | Jackson et al. | July 3, 1951 |

FOREIGN PATENTS

| | | |
|---|---|---|
| 451,170 | Great Britain | July 30, 1936 |